US006975469B2

(12) United States Patent
Sakai

(10) Patent No.: US 6,975,469 B2
(45) Date of Patent: Dec. 13, 2005

(54) SERVO DATA CODED RECORDING SYSTEM FOR DISK DRIVE

(75) Inventor: Yuji Sakai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 668 days.

(21) Appl. No.: 09/942,741

(22) Filed: Aug. 31, 2001

(65) Prior Publication Data

US 2002/0034031 A1    Mar. 21, 2002

(30) Foreign Application Priority Data

Sep. 21, 2000   (JP)   ............................. 2000-287590

(51) Int. Cl.$^7$ .............................................. G11B 5/09
(52) U.S. Cl. ...................................................... 360/46
(58) Field of Search .............................. 360/46, 67, 75, 360/49, 39, 53, 77.08, 48, 69

(56) References Cited

U.S. PATENT DOCUMENTS

| 4,414,589 | A | * | 11/1983 | Oliver et al. | ............ | 360/77.07 |
| 5,682,153 | A | | 10/1997 | Ishiguro | ...................... | 341/53 |
| 5,786,957 | A | * | 7/1998 | Inoue et al. | ............. | 360/77.08 |
| 5,815,342 | A | | 9/1998 | Akiyama et al. | ........ | 360/97.01 |
| 5,886,842 | A | | 3/1999 | Ziperovich | ................... | 360/51 |
| 5,914,828 | A | * | 6/1999 | Bruner et al. | ................. | 360/69 |
| 6,122,134 | A | * | 9/2000 | Kaaden et al. | ................ | 360/48 |
| 6,404,570 | B1 | * | 6/2002 | McNeil et al. | ................ | 360/31 |

FOREIGN PATENT DOCUMENTS

JP         5-4866         4/1984

OTHER PUBLICATIONS

NN 76012656 Title: "Null Servo Pattern", IBM Technical Disclosure Bulletin, Jan., 1976, vol. 18, Issue No. 8, pp. 2656-2657.*

* cited by examiner

*Primary Examiner*—David Hudspeth
*Assistant Examiner*—Glenda P. Rodriguez
(74) *Attorney, Agent, or Firm*—Pillsbury Winthrop Shaw Pittman, LLP

(57) ABSTRACT

In a disk drive of the perpendicular magnetic recording method, there is disclosed a servo data encoding method for recording servo data with a particularly low frequency on a disk. The coded data of the servo data by this method is coded with DC free code which is capable of suppressing a direct current component of the read signal waveform. As a consequence, in the case where signal processing is conducted in the read/write channel by the cut-off low frequency characteristic, a waveform distortion can be suppressed which is generated in the read signal waveform by the cut-off low frequency characteristic. Consequently, an improvement in the read error rate in the read/write channel can be realized.

5 Claims, 14 Drawing Sheets

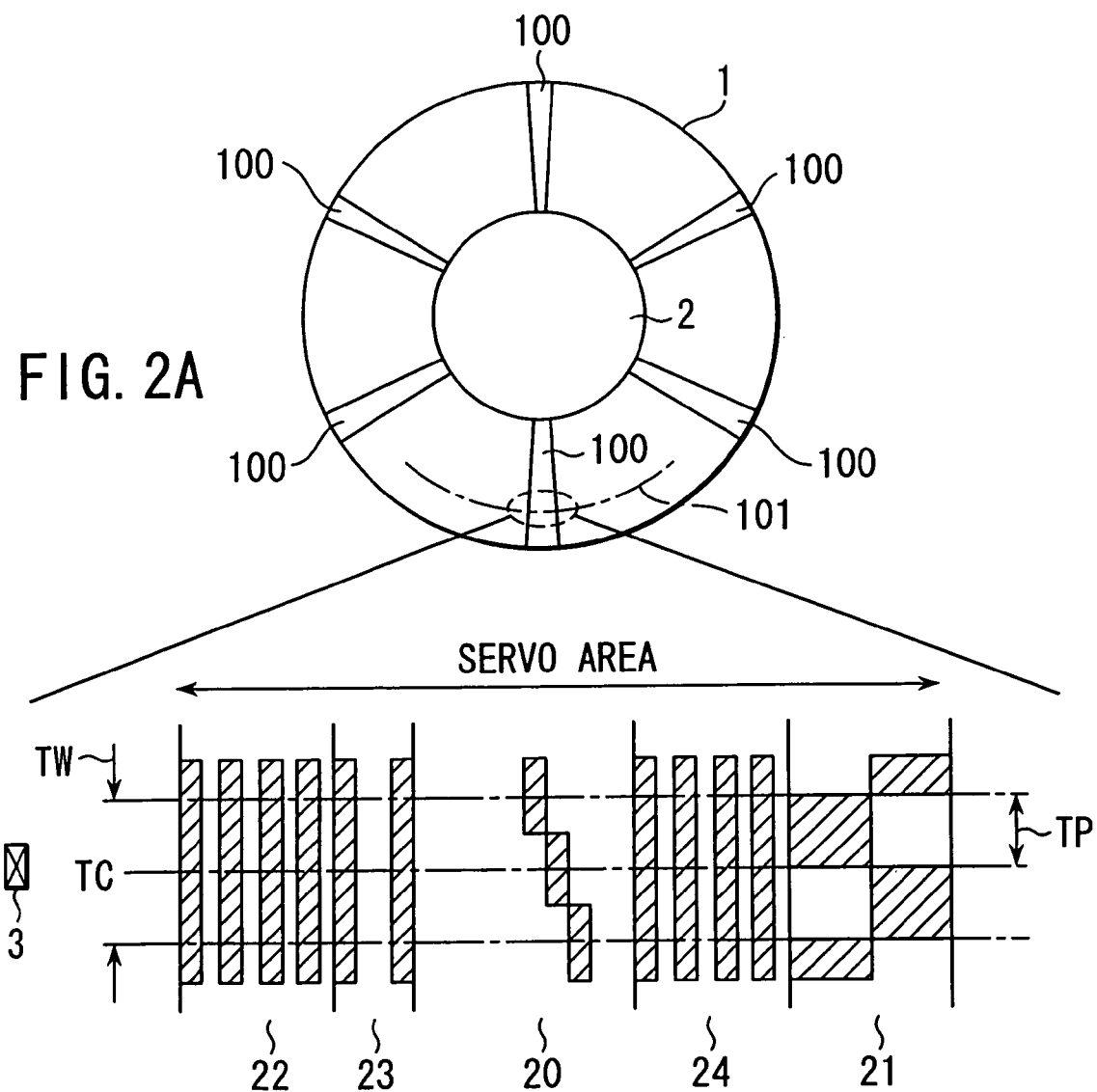

FIG. 3A 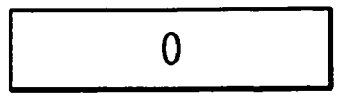 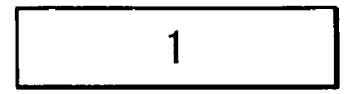
FIG. 3B 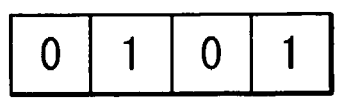 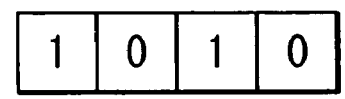
FIG. 3C  
FIG. 3D 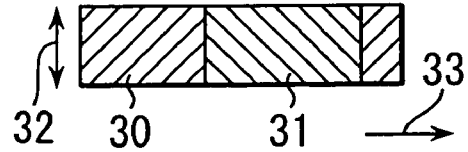 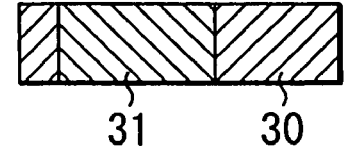
FIG. 4A 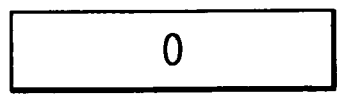 
FIG. 4B  
FIG. 4C  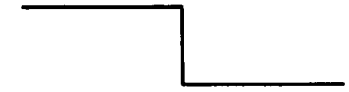
FIG. 4D 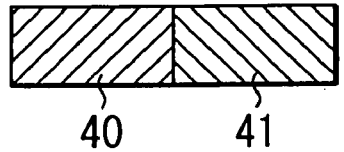 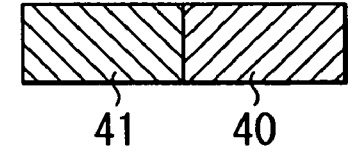
FIG. 5A 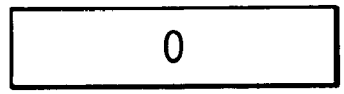 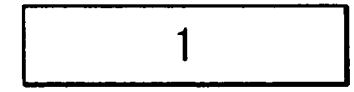
FIG. 5B 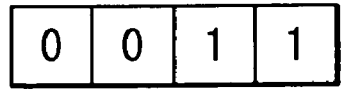 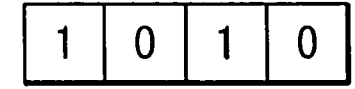
FIG. 5C  
FIG. 5D  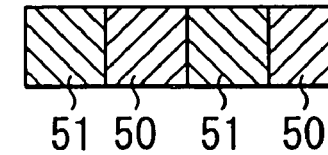

| | Tmin=65(bit) | | |
|---|---|---|---|
| N | $fc = \frac{-\ln N}{2\pi T_{min}}$ | BER | BER(log) |
| 0.1 | 5.64E-03 | 4.46E-01 | -0.3506 |
| 0.2 | 3.94E-03 | 4.09E-01 | -0.3880 |
| 0.3 | 2.95E-03 | 3.81E-01 | -0.4192 |
| 0.4 | 2.24E-03 | 3.44E-01 | -0.4631 |
| 0.5 | 1.70E-03 | 2.97E-01 | -0.5272 |
| 0.6 | 1.25E-03 | 2.26E-01 | -0.6454 |
| 0.7 | 8.73E-04 | 1.14E-01 | -0.9419 |
| 0.8 | 5.46E-04 | 2.93E-05 | -4.5324 |
| 0.9 | 2.58E-04 | 1.49E-05 | -4.8268 |
| 1.0 | 0.00E+00 | 1.10E-05 | -4.9586 |

SERVO DATA CODED RECORDING SYSTEM FOR DISK DRIVE

CROSS-REFERENCE TO RELATED APPLICATIONS

This application is based upon and claims the benefit of priority from the prior Japanese Patent Application No. 2000-287590, filed Sep. 21, 2000, the entire contents of which are incorporated herein by reference.

BACKGROUND OF THE INVENTION

1. Field of the Invention

The present invention generally relates to a disk drive of a perpendicular magnetic recording system, and particularly to a servo data coded recording system.

2. Description of the Related Art

In recent years, in the field of disk drives represented by a hard disk drive or the like, a perpendicular magnetic recording method is noted. This method enables an increase in the density of recording as compared with the conventional longitudinal magnetic recording method.

In the longitudinal magnetic recording method, as shown in FIG. 16A, in the case where data (bit "0" or "1") is recorded on the data track 160 on the disk, a magnetized area (shown by an arrow 162) corresponding to the data is formed in a longitudinal direction (corresponding to the rotation direction 161) of the disk. FIG. 16B is a view showing a read signal waveform read with a head (magnetic head).

In the disk drive in which the perpendicular magnetic recording method is adopted, the read signal read from the disk includes low frequency components (DC components). Consequently, the read signal is liable to be affected by the cut-off low frequency characteristic of the read/write channel, so that a waveform distortion tends to be easily generated in the read signal waveform. Consequently, at the time of the processing of the PRML method signal processing in the read/write channel, error data is detected so that there is a possibility that the read error rate is heightened. Conventionally, there is proposed a technique for preventing a decoding error on the receiving side at the time of transmitting coded data including direct current error (see, for example, Japanese Unexamined Patent Publication No. 5-4866). However, it is hard to apply the prior art to the perpendicular magnetic recording method disk drive as it is.

Furthermore, in the disk drive, the read signal includes low-frequency servo data together with relatively high frequency user data. Consequently, the read signal corresponding to the servo data has a signal waveform which is liable to be affected by the influence of the cut-off low frequency characteristic of the read/write channel. When the read error rate of the servo data is heightened, the possibility becomes higher that the decoded data of the servo address includes error data. Since a servo address is used in the head position control, the generation of the servo address 2 will lead to a reduction in the precision of the head positioning control (that is, performance of the servo system). As a consequence, in the perpendicular magnetic recording system, the reduction in the performance of the servo system becomes one problem which hinders the practical use of the servo system.

BRIEF SUMMARY OF THE INVENTION

An object of the present invention is to realize an improvement in the performance of a servo system by improving a read error of servo data under the influence of the cut-off low frequency characteristic of the read/write channel in the disk drive of the perpendicular magnetic recording method thereby promoting the realization of a disk drive of the perpendicular magnetic recording method.

In summary, the characteristic of the present invention is concerned with a disk drive provided with a servo data coded recording system for encoding the servo data to record the data on the disk so that the direct current component (or the low frequency component) can be suppressed from the read signal waveform in the disk drive of the perpendicular magnetic recording method.

Specifically, the disk drive of the present invention has a perpendicular magnetic recording system, and a servo area on which servo data for use in head position control is recorded, the servo area being provided with a disk medium on which the servo data is recorded which is coded with a DC-free code.

Such disk drive has a cut-off low frequency characteristic, because a read/write channel applied to the perpendicular magnetic recording system includes a differential circuit. In the disk drive of the present invention, the servo data recorded on the disk is coded with the DC-free code in which the direct current (DC) component is suppressed. Consequently, in the case where signal is processed with the read/write channel because the DC component is suppressed in the read signal waveform read with the head, the generation of the waveform distortion in the read signal waveform is suppressed. As a consequence, in the decoding processing in the read/write channel, the read error rate at the time of decoding the servo data can be lowered.

For the reasons described above, in the disk drive according to the present invention, an error included in the servo data (in particular, servo address) read from the servo area on the disk can be decreased, so that the precision of the control of the head positioning can be improved. Therefore, as a consequence, the performance of the servo system can be improved thereby making it possible to promote the realization of a disk drive of the perpendicular magnetic recording system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIGS. 2A and 2B are views for explaining a servo data structure according to the embodiment.

FIGS. 3A to 3D are views for explaining a first servo data encoding method according to the embodiment.

FIGS. 4A to 4D are views showing a variation of the first servo data encoding method according to the embodiment.

FIGS. 5A to 5D are views showing a variation of the first servo data encoding method according to the embodiment.

FIGS. 6A to 6E are views showing a process of encoding/decoding of the servo data according to the embodiment.

FIGS. 7A to 7F are views showing one example of servo data and coded data thereof according to the embodiment.

FIGS. 15A to 15E are views showing the encoding and decoding process of conventional servo data.

FIGS. 18A to 18F are views showing one example of the servo data and the encoding data thereof.

DETAILED DESCRIPTION OF THE INVENTION

Figure 1:
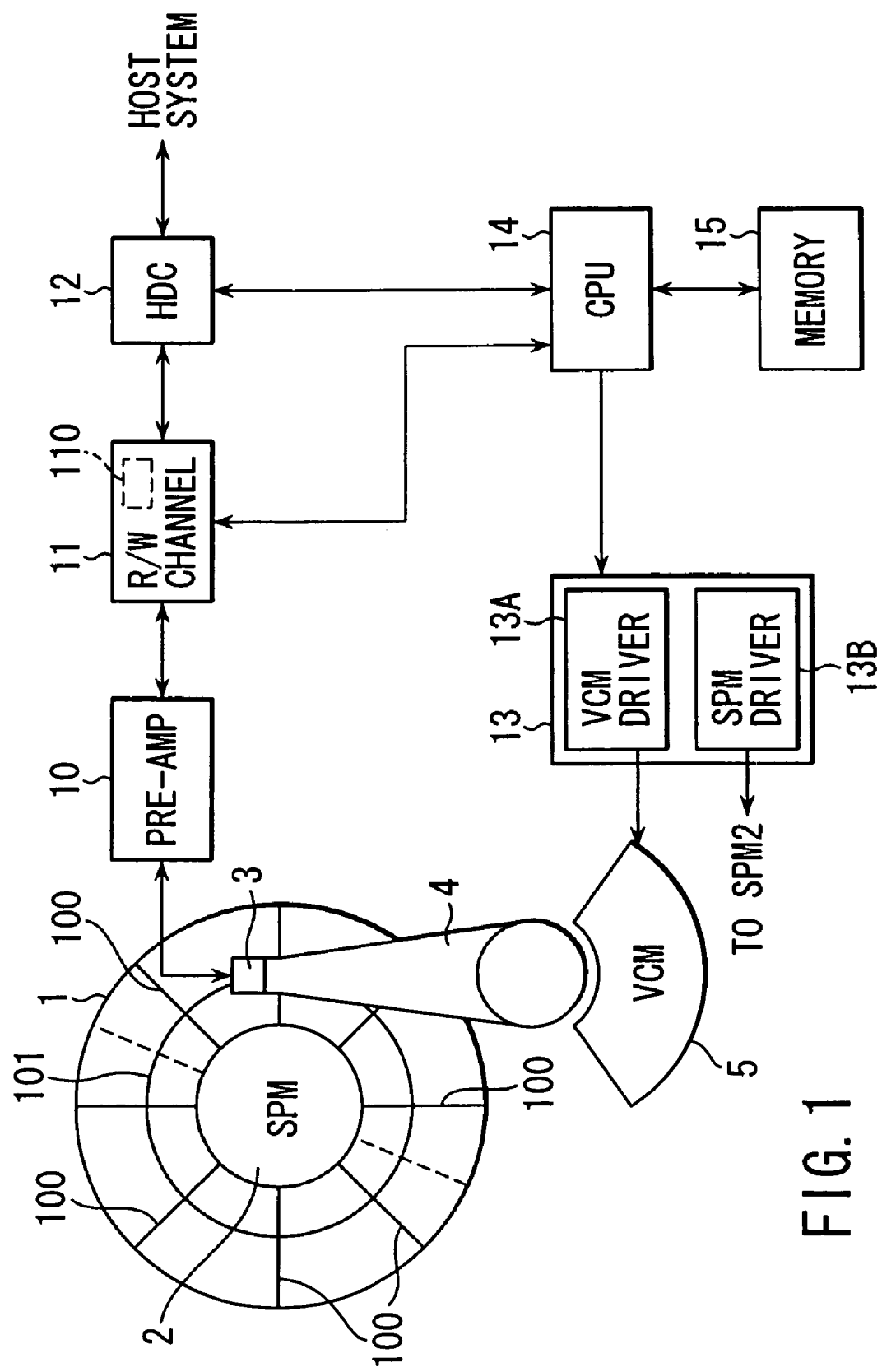
FIG. 1 is a block diagram showing an essential portion of a disk drive according to an embodiment of the present invention.

Hereinafter, referring to the drawing, there will be explained embodiments of the present invention.

(Structure of Disk Drive)

With respect to a disk drive according to the embodiments, a hard disk drive having a perpendicular magnetic recording system is assumed. As shown in FIG. 1, the disk drive has a drive mechanism comprising a disk 1 having a magnetic anisotropy in a perpendicular direction, a spindle motor (SPM) 2 for rotating the disk 1, and an actuator mounting a head 3 for moving the head 3 in a radial direction on the disk 1.

The actuator comprises an arm 4 (including a suspension) 4 mounting a head 2, and a voice coil motor (VCM) 5 for generating a driving force. The actuator positions the head 3 on the target position (a target track) on the disk 1 under the servo control of a microprocessor (CPU) 14.

Here, the head 3 has a structure in which the read head comprising a giant magnetoresistive type device (GMR device) and a write head (interactive thin film head) which enables perpendicular magnetic recording are separated to be packaged on a slider.

Drive electronics have a preamplifier circuit 10, a read/write channel 11, a disk controller (HDC) 12, a motor driver 13, a CPU 14, and a memory 15.

The preamplifier circuit 10 has a read amplifier for amplifying a read signal read with the head 3, and a light amplifier for converting light data into light current. The read/write channel 11 conducts PRML (Partial Response Maximum Likelihood) method signal processing to decode user data and servo data from the read signal. Furthermore, the read/write channel 11 conducts, for example, the RLL (run length limited) encoding processing of the write data (user data). The HDC 12 constitutes an interface between the drive and the host system (a personal computer and a digital device) to conduct a transfer control of read/write data.

Here, the read/write channel 11 includes a differential circuit 110 for differentiating the waveform of the read signal read with the head 3 from the disk 1 to create a differential waveform (corresponding to the signal waveform in the longitudinal magnetic recording method). The read signal waveform according to the embodiments has a rectangular configuration including a direct current (DC) component (or a low frequency component). This differentiating circuit 110 corresponds to one type of high path filter (HPF) associated with the cut-off low frequency characteristic of the read/write channel 11. Incidentally, in the read/write channel 11, the data reproduction circuit (decoder) for decoding digital data from the differential waveform of the read signal waveform adopts the same circuit as the longitudinal magnetic recording method.

The CPU 14 is a main controller of a drive. The CPU 14 is a main element of a servo system for conducting position control of the head 3. The CPU 14 conducts the position control of the head (a seek operation and a track following operation) in accordance with servo data read from the read/write channel 11. Specifically, the CPU 14 controls the VCM 5 of the actuator by controlling the input value (control voltage value) of the VCM driver 13A. The memory 15 includes a RAM, a ROM, and a flash EEPROM and stores the control program of the CPU 14 and various control data. The motor driver 13 has an SPM driver 13B for driving a spindle motor (SPM) 3 together with the VCM driver 13A.

(Disk Structure)

A disk 1 is rotated at a high speed with the spindle motor 2 at the time of the operation of the read/write operation of the data. On the disk 1, a servo area 100 is provided for recording servo data with a dedicated device referred to as a servo track writer at the time of manufacture (shown in FIG. 2A). On the disk 1, a large number of tracks 101 including the servo area 100 are concentrically constituted. The servo area 100 is arranged in a predetermined interval in a peripheral direction. Between servo areas 100 of each track 101, a plurality of data sectors are constituted.

In each of the servo areas 100, as shown in FIG. 2B, a servo address 20 comprising a track address (a cylinder number) and a servo sector number, and servo data including servo burst data 21, a preamble 22, a sync mark 23 and postamble 24 are recorded. The servo address 20 is data for differentiating servo tracks and servo sectors. The servo burst data 21 is a position error signal used in the track following operation for positioning the head 3 to the range (actually, on the center line TC of the track) within the data track (track width TW). The unit of the servo burst data 21 corresponds to the track pitch TP of the servo track.

(Method for Encoding Servo Data and Read Operation)

Figure 17A:
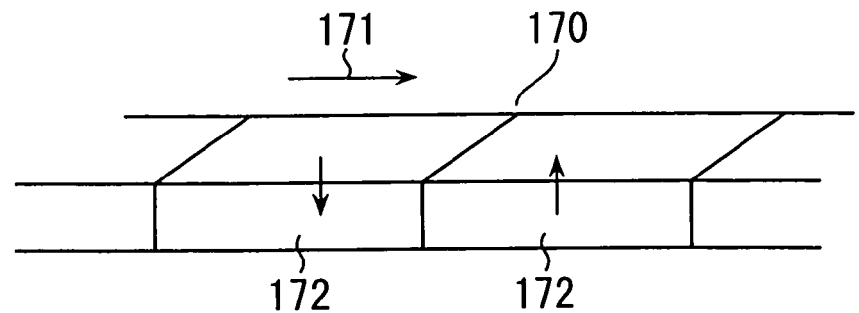
FIGS. 17A and 17B are views for explaining the conventional perpendicular magnetic recording method.

In the perpendicular magnetic recording method, as shown in FIG. 17A, in the case where data is recorded on a data track 170 on the disk (rotation direction 171), a magnetized area (shown by an arrow 172) is formed in a perpendicular direction (a depth direction) with respect to the disk surface. In the perpendicular magnetic recording method, the signal resolution is relatively high, and an attenuation of a signal amplitude is small even in a linear recoding density, so that a high surface recording density can be realized.

Figure 16A:
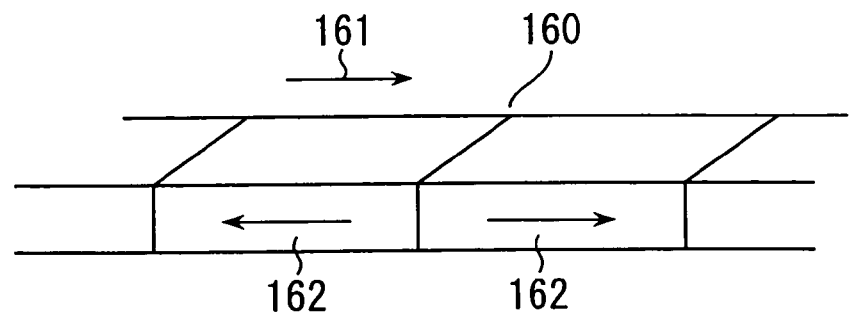
FIGS. 16A and 16B are views for explaining a conventional longitudinal magnetic recording method.
Figure 16B:
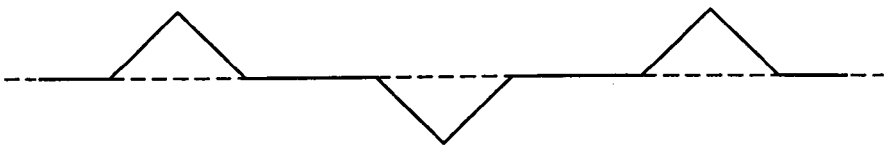
Figure 17B:
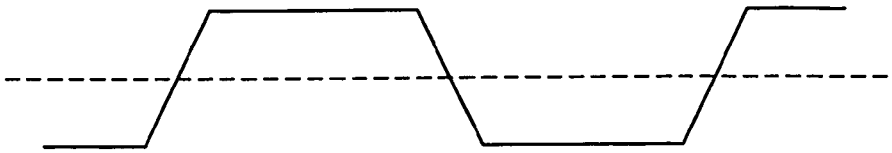

However, in the perpendicular magnetic recording method, as shown in FIG. 17B, the read signal waveform read with a head has a rectangular configuration including a direct current (DC) component (a low frequency component). That is, in the read signal waveform, the amplitude is changed in the magnetized transfer region, and the read signal waveform is converted into a rectangular waveform in which the amplitude corresponds to the magnetizing direction (172). Consequently, on the disk drive of the perpendicular magnetic recording method, the read/write channel adopted in the conventional magnetic recording method cannot be adopted as it is. Then, in the disk drive of the perpendicular magnetic recording method, a read/write channel including a differential circuit is being investigated. The differential circuit differentiates the read signal waveform in the perpendicular magnetic recording method shown in FIG. 17B to create a differential waveform corresponding to the read signal waveform in the longitudinal direction magnetic recording method as shown in FIG. 16B. As a consequence, as a data reproduction circuit (decoder) for decoding the read signal waveform to digital data in the read/write channel, the same data reproduction circuit as the longitudinal magnetic recording method can be adopted.

Here, since the differential circuit functions as a kind of high-pass filter, the read/write channel has a cut-off low frequency characteristic. In other words, the read/write channel having a differential circuit conducts signal processing of removing a low frequency component from the read signal transmitted from the head. As a consequence, in the disk drive of the perpendicular magnetic recording method, there is a high possibility that a distortion is generated in the read signal waveform including a low frequency component shown in FIG. 17B under the influence of the cut-off low frequency characteristic of the read/write channel. In the read/write signal waveform having such a waveform distortion, a decoding error rate (a read error rate) becomes high when data is decoded.

In the disk drive, except for the data track which is a user data recording area, there is provided a servo area on which servo data is recorded in advance. The servo data is used for position controlling the head to the target position (target track) on the disk. The servo data includes a track address (which is referred to as a track number or a cylinder code) and a servo sector address (a servo sector number). Hereinafter, the track address and the servo sector address are generally referred to and described as a servo address. Generally, the servo data has a low recording frequency as compared with the user data. As a consequence, in the perpendicular magnetic recording method, there is a problem that a read error rate is deteriorated particularly because of a distortion in the reproduction signal waveform of the servo data, and a precision in the head positioning control is reduced.

Hereinafter, there will be specifically explained a reproduction characteristic with respect to the servo data recorded on the disk. Here, the servo data includes a preamble data pattern and a postamble data pattern other than the servo address. Furthermore, it is supposed that the servo data is recorded with NRZI (non return to zero inverted) encoding method. The servo data (0/1) is converted, for example, into a coded data (0000/1010).

FIGS. 18A to 18C are views showing servo data before the encoding. FIG. 18A is a view showing a preamble, FIG. 18B is a view showing a servo address, and FIG. 18C is a view showing a postamble. FIG. 18D is a view showing the preamble after encoding. FIG. 18E is a view showing a servo address. FIG. 18F is a view showing the postamble after encoding.

Figure 19A:
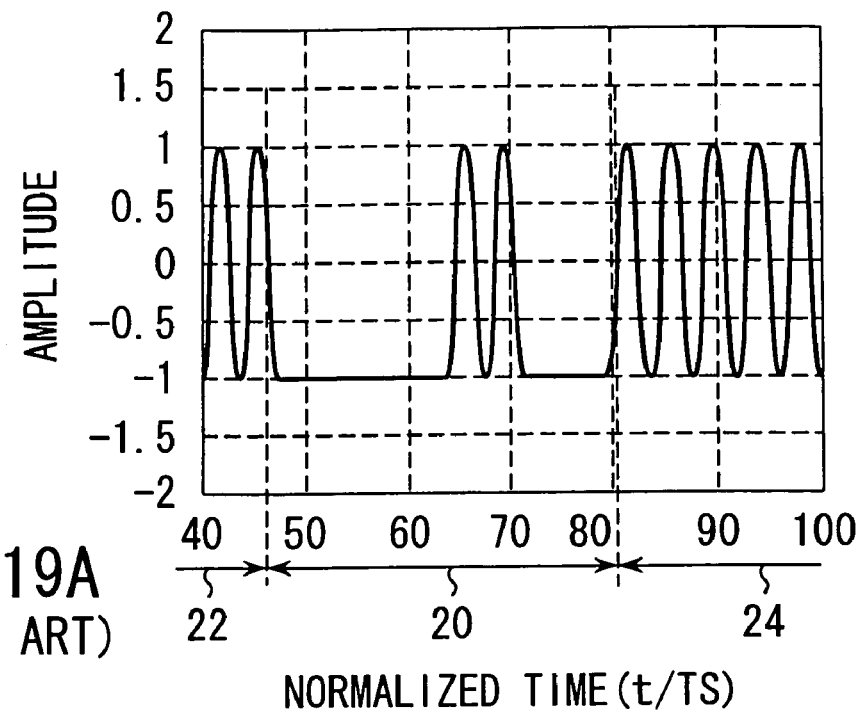
FIGS. 19A and 19B are views showing one example of a read reproduction signal waveform corresponding to the servo data in the prior art.
Figure 20A:
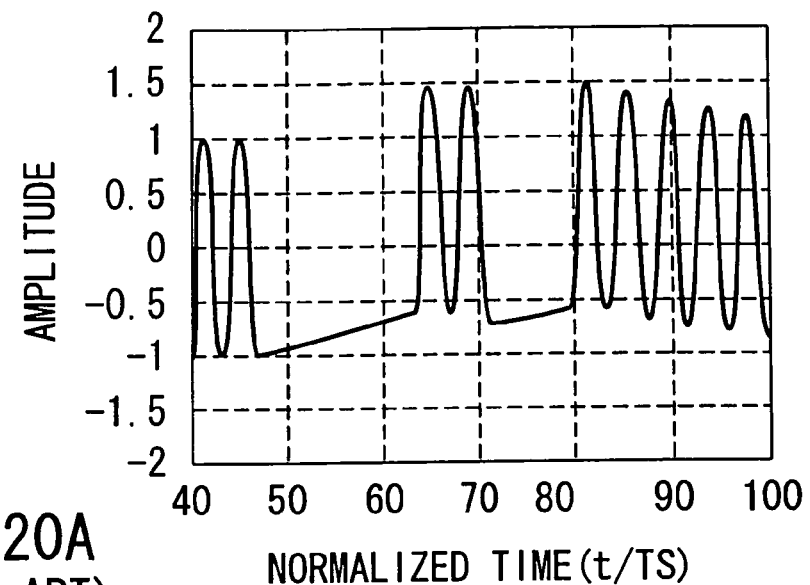
FIGS. 20A and 20B are views showing the read signal waveform in the case where the signal is affected by the low area shield characteristic in the prior art.

In the case where the servo data after each encoding is recorded on the disk by means of a NRZI method, the read signal read with the head is a signal waveform as shown in FIG. 19A or 20A. Here, in the read signal waveform, the range 20 is a signal waveform corresponding to the postamble, the range 22 is a signal waveform corresponding to the preamble, the range 24 is a signal waveform corresponding to the postamble. Here, the read signal waveform shown in FIG. 19A is a waveform in the case where the waveform is not affected by the low area shield characteristic of the read/write channel described above. On the other hand, the read signal waveform shown in FIG. 20A is a signal waveform in the case where the signal is affected by the low area shield characteristic. Incidentally, for the sake of convenience, it is assumed that each read signal does not include noise.

Here, it is assumed that the read/write channel satisfies the condition of fc=(−ln0.5)/(2πTmin) as the cut-off low frequency fc (frequency in which the amplitude characteristic is lowered by 3 dB). Here, ln is a natural logarithm. Furthermore, Tmin refers to the time of the minimum magnetization reversion interval of the servo data, and Tmin=17 Tb (Tb: bit cycle after encoding) is provided. Furthermore, a read/write channel conducts a PRML (partial response maximum likelihood) method signal processing. Specifically, the read/write channel detects data with the ML decoding method (or Viterbi decoding method) with respect to a signal with which equalization processing of class 2 (PR2) is conducted.

Figure 19B:
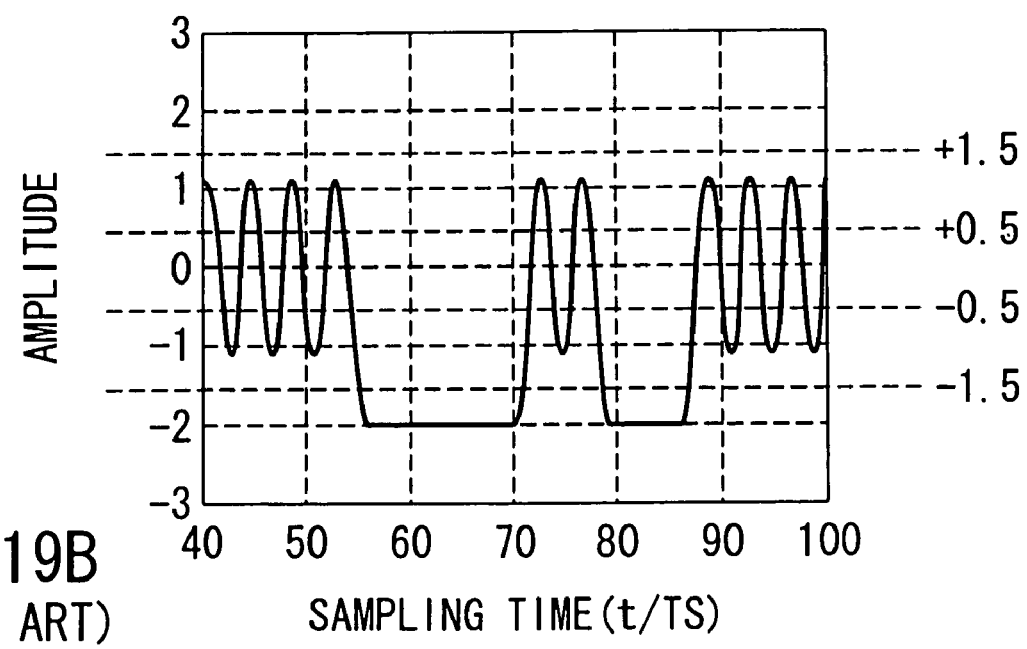

FIG. 19B is a view showing a signal waveform after processing with the PR2 equalizing method in the read/write channel. In the read/write channel, in the case of a signal which does not include noise, the five sample values of 0, ±1, and ±2 are differentiated with sample values 0 and ±2 being differentiated to data 0, and the sample values ±1 being set to data 1. Furthermore, in the read/write channel, this differentiation data is decoded with the post coder having a transmission polynomial to be decoded into a record data (corresponding to the data after encoding).

FIGS. 15A to 15E are views each showing a process of encoding and decoding of the servo data in the case where the data is not affected by the cut-off low frequency of the read/write channel.

FIG. 15A is a view showing a data bit row before the encoding of the servo address. FIG. 15B is a view showing data after encoding which is recorded on the disk after the encoding in the NRZI method. FIG. 15C is a view showing a sample value read from the disk and obtained in the PR2 equalization processing in the read/write channel. FIG. 15D is a view showing differential data which is data (I/O) detected from the sample value in the ML decoding. FIG. 15E is a view showing data which is decoded with the post coder.

As has been described above, under the influence of the cut-off low frequency characteristic of the read/write channel, a signal distortion which changes an envelop is generated in the read signal waveform as shown in FIG. 20A.

Figure 20B:
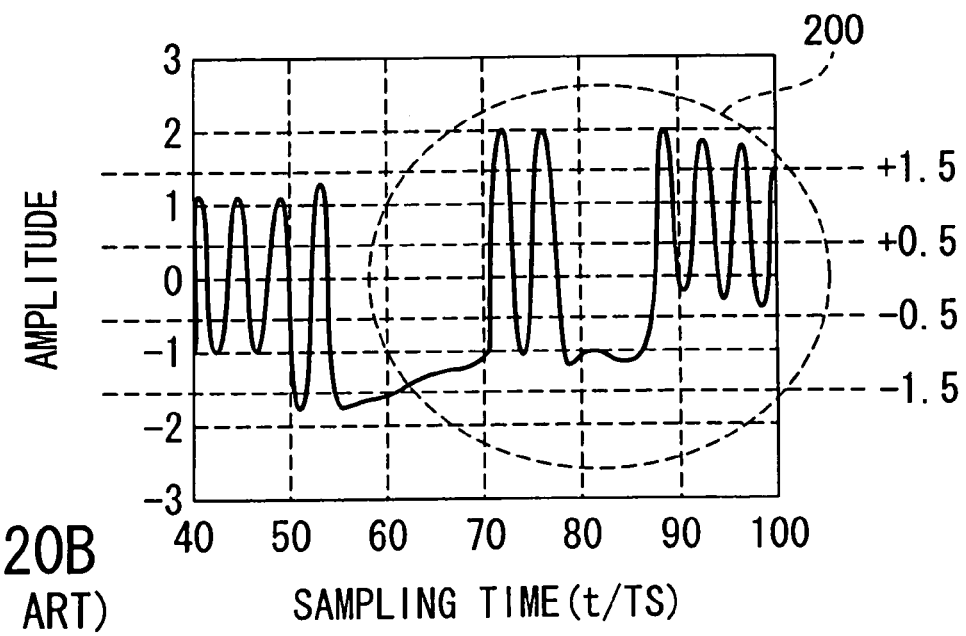

Therefore, in the read/write channel, in the read signal waveform after the equalization processing, as shown in FIG. 20B, the sample value is shifted (see the designated range 200). Consequently, when data (0/1) is detected, an error is detected in the differential data.

In the above perpendicular magnetic recording method disk drive, as described above, the read signal read from the disk 1 to the head 3 includes the low frequency component (or DC component). Consequently, the read signal waveform with particularly low frequency servo data is liable to be affected by the cut-off low frequency characteristic (circuit characteristic of the differential circuit 110) of the read/write channel 11 with the result that waveform distortion is likely to be generated. Consequently, in the read/write channel 11, in the case where the data decoding processing is conducted via the PRML method signal processing, the possibility is high that an error data is detected. In summary, there is a possibility that the read error rate becomes high.

Next, there will be explained a first servo encoding method in which the record encoding method is improved in the case where particularly the servo address 20 is recorded on the servo area 100.

The first servo encoding method converts the servo data (0/1) shown in FIG. 3A into the coded data (0101/1010) shown in FIG. 3B to conduct the perpendicular magnetic recording of the data on the servo area 100 of the disk 1 with the NRZI encoding method. Here, in the recording operation of the servo data, the servo track writer is used to conduct the perpendicular magnetic recording with the head 3 (write head) of the disk drive.

FIG. 3C is a view showing the record current waveform output from the head 3 (write head) at the time of recording the data on the disk 1. Furthermore, the data is a read signal waveform which is read from the head 3 (read head) when reading the data from the disk 1. Here, as shown in FIG. 3D, in the first servo encoding method, the data is magnetically recorded so that the sum total of the length in the longitudinal direction (shown by an arrow 33, corresponding to the rotation direction of the disk) becomes equal in the magnetized area 30 with the positive polarity and in the magnetized area 31 with the negative polarity which are formed on the disk 1 in accordance with the record current waveform. Incidentally, in FIG. 3D, in the arrow 33 in the horizontal direction, the arrow 32 in the vertical direction 32 refers to a track width (a radial direction of the disk). Hereinafter, the direction relationship is the same as in FIGS. 4A through 4D and FIGS. 5A through 5D.

FIGS. 4A through 4D are views showing a first variation of the first servo encoding method. That is, in the variation, the servo data (0/1) shown in FIG. 4A is converted into the coded data (01/10) shown in FIG. 4B to be subjected to the data to the perpendicular magnetic recording to the servo area 100 on the disk 1 with the NRZI encoding method. FIG. 4C is a view showing a record current waveform output from the head 3 (write head) when recording the head on the disk 1. Furthermore, FIG. 4C is a view showing a read signal waveform output from the head 3 (read head) at the time of reading from the disk 1.

In this variation in this manner, as shown in FIG. 4D, in the magnetized area 40 with the positive polarity and in the magnetized area 41 with the negative polarity on which data is recorded in accordance with the record current waveform as shown in 4D, data is magnetically recorded on the disk so that the sum total of the length in the respective longitudinal directions becomes equal.

Furthermore, FIGS. 5A through 5D are different variations of the first servo encoding method. That is, this variation is such that the servo data (0/1) shown in FIG. 5A is converted into coded data (0011/1010) shown in FIG. 5B to be subjected to the perpendicular magnetic recording to the servo area 100 on the disk 1 with the NRZI encoding method. FIG. 5C is a view showing the record current waveform output from the head 3 (write head) at the time of recording the data on the disk 1 and a read signal waveform read from the head 3 (read head) at the time of reading the data from the disk 1.

In this variation in the same manner, as shown in FIG. 5D, in the magnetized area 50 with the positive polarity and in the magnetized area 51 with the negative polarity formed on the disk 1 in accordance with the record current waveform, the data is magnetically recorded so that the sum total of the length in the longitudinal direction becomes equal.

As has been described above, in summary, the first servo encoding method and each of the variations code the servo address included in the servo data (0/1) with the DC (direct current)-free code which can suppress the DC component to be subjected to the perpendicular magnetic recording on the disk 1. In the disk drive, the servo data is read as the read signal waveform from the servo area 100 by the head 3 (read head). The servo data is sent to the read/write channel 11 from the servo area 100 on the disk 1. Since the read signal waveform is a waveform in which the DC component (or a low frequency component) is suppressed, the influence of the cut-off low frequency characteristic (circuit characteristic of the differential circuit 110) of the read/write channel 11 can be suppressed. Consequently, the servo address can be decoded at a high precision in the read/write channel.

There will be explained hereinbelow a specific example in which the first servo encoding method is applied.

FIGS. 7A through 7C are views showing servo data before encoding. FIG. 7A is a view showing a preamble. FIG. 7B is a view showing a servo address. FIG. 7C is a view showing a postamble. On the other hand, FIG. 7D is a view showing a preamble after encoding. FIG. 7E is a view showing a servo data after encoding. Furthermore, FIG. 7F is a view showing a postamble after encoding.

Figure 8A:
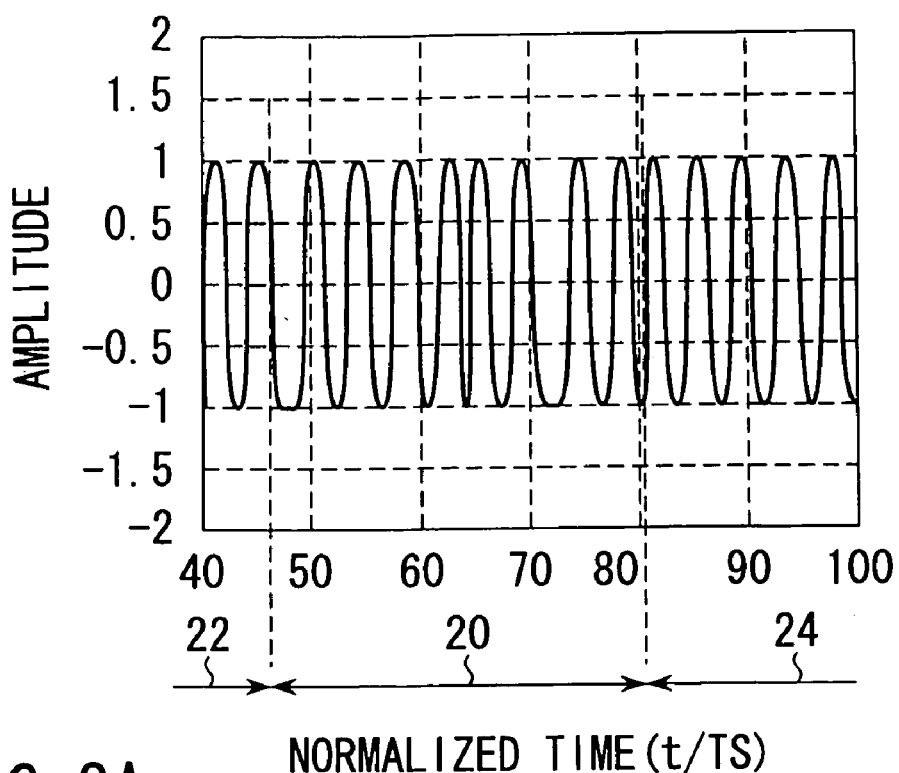
FIGS. 8A and 8B are views showing one example of a read reproduction signal waveform corresponding to the servo data according to the embodiment.
Figure 9A:
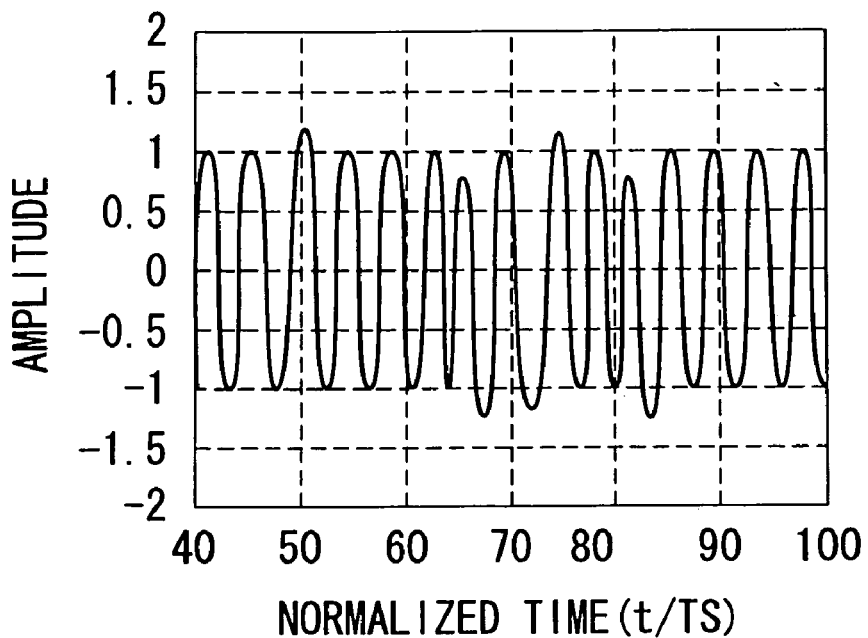
FIGS. 9A and 9B are views showing a read signal waveform in the case where the signal is affected by the low area shield characteristic according to the embodiment.

In the case where data after each encoding is recorded on the disk 1 in the NRZI encoding method, the read signal read from the head 3 has the waveform shown in FIG. 8A and FIG. 9A. FIG. 8A is a view showing a read signal waveform in the case where the signal waveform is not affected by the influence of the cut-off low frequency characteristic. On the other hand, FIG. 9A is a view showing a read signal waveform in the case where the signal waveform is affected by the influence of the cut-off low frequency characteristic. Incidentally, for the sake of convenience, it is supposed that each read signal does not include noise.

Here, in the read/write channel for processing the reproduction signal, it is supposed that the relationship between the cut-off low frequency fc and the minimum magnetization reverse interval time Tmin of the servo data satisfies the condition of $Tmin \leq (-\ln 0.5)/(2\pi fc)$. Here, Tmin is Tmin=2 Tb (Tb: bit cycle after encoding) while Tb is $Tb=(-\ln 0.5)/(4\pi fc)$. In the case where the low area shield frequency fc is relatively high, the servo data (0/1) is converted into the coded data (01010101/10101010) to be recorded in the NRZI encoding method.

Figure 8B:
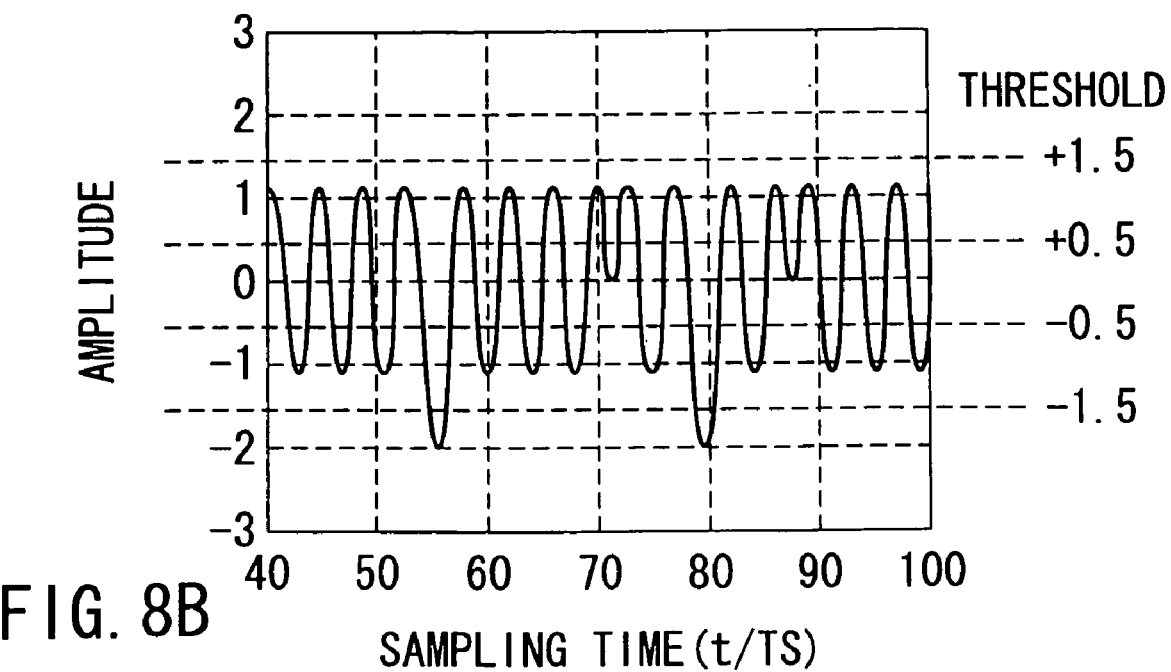

The read/write channel 11 conducts the PRML method signal processing as described above. Here, data detection is conducted in the ML decoding method with respect to a signal after equalization processing of class 2 (PR 2 method). FIG. 8B is a view showing a waveform after the read signal in the case where the signal is free from the influence of the low area characteristic shown in FIG. 8A is equalized in the PR 2 method. In the case of a signal which includes no noise, five sample values of 0, ±1, and ±2 are taken. While sample values 0 and ±2 are differentiated to "0" while the sample value ±1 is differentiated to data "1". Furthermore, this differentiation data is decoded with the post coder having a transmission polynomial of "1/(1+D)" to be decoded to data which is record data.

Figure 9B:
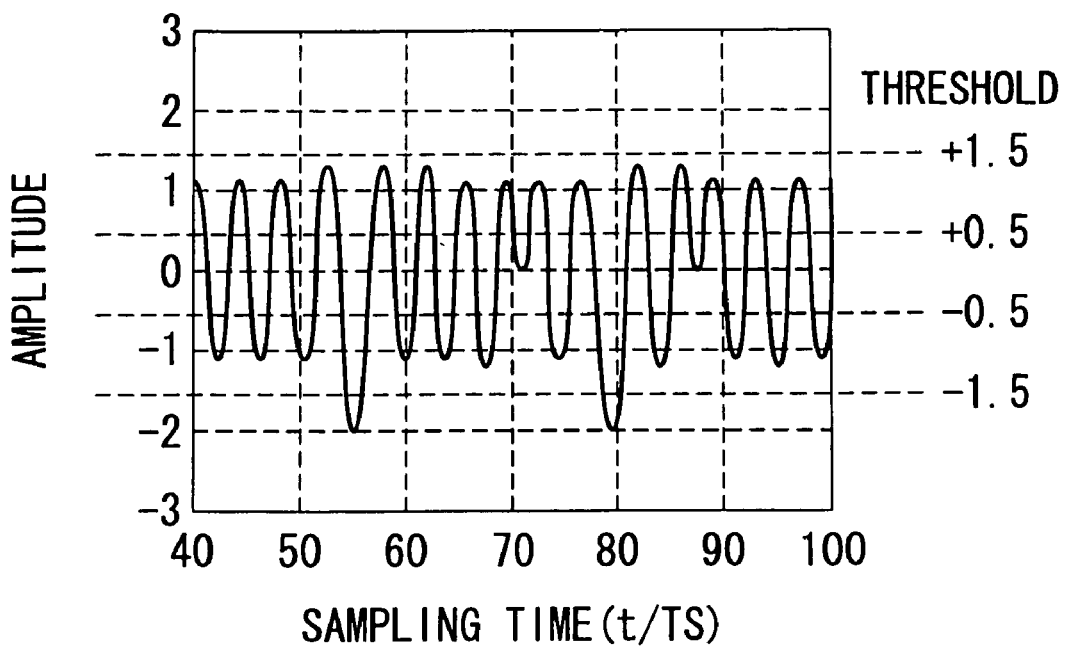

Furthermore, in the case where the servo data is recorded on the disk 1 with the first servo encoding method, no envelop variation under the influence of the cut-off low frequency characteristic of the read/write channel 11 is seen in the read channel as shown in FIG. 9 despite the influence of the cut-off low frequency characteristic of the read/write channel 11. As a consequence, although some shifts are generated in the sample value as shown in FIG. 9B in the read signal waveform after the signal waveform is equalized in the PR 2 method in the read/write channel 1. Like the read signal waveform which is equalized in the case where the waveform is not affected by the low shield shown in FIG. 8B, it becomes possible to obtain normal differential data when the data (0/1) is detected with ML decoding from the sample value.

FIGS. 6A to 6E are views showing a process of encoding and decoding of the data in the embodiment in the case where the waveform is not affected by the cutoff low frequency characteristic.

FIG. 6A is a view showing data before encoding of the servo address. FIG. 6C is a view showing a sample value obtained in the equalization processing of the PR 2 method in the read channel after data after encoding shown in FIG. 6B is NRZI recorded. FIG. 6D is a view showing differential data wherein data (0/1) is detected from the sample value in the ML decoding. Furthermore, FIG. 6E is a view showing data after encoding in which data is decoded with the post coder.

Here, even in the case where the servo data (0/1) is coded and recorded so that the sum total of the length in the longitudinal direction of respective magnetized region with positive polarity and respective magnetized region with negative polarity are equal, it has been experimentally confirmed that a portion where the amplitude of the signal waveform is flat changes toward a zero level approximately at $\exp(-2\pi \cdot fc \cdot t)$, so that a signal distortion is generated.

(Second Servo Encoding Method)

Hereinafter, a second servo encoding method according to the embodiment will be explained.

As has been described above, it is effective that an encoding recording is conducted wherein the minimum magnetization reverse interval time Tmin of the servo data satisfies a condition of $Tmin \leq (-\ln 0.5)/(2\pi fc)$ with respect to the cut-off low frequency fc of the read/write channel 11. Here, "ln" refers to a natural logarithm. It has been confirmed by computer simulation that the heightening of the read error rate with respect to the servo data can be suppressed even in the case where a signal distortion is generated in the read signal waveform with this second servo encoding method.

Figures 10A, 10B:
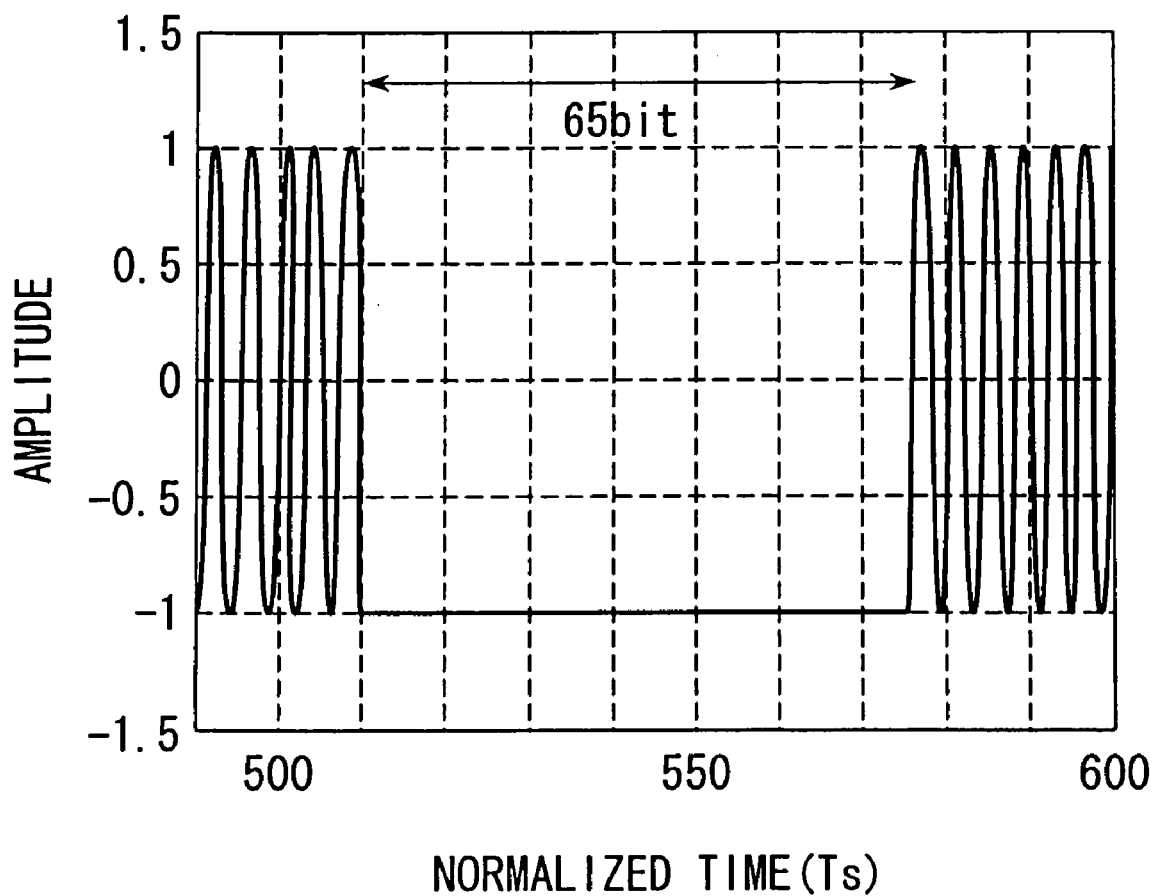
FIGS. 10A and 10B are views showing a result of a simulation experiment associated with the second servo encoding method according to the embodiment.

Hereinafter, the results of computer simulation are shown. In the simulation, the servo address of all the 16 bits data 0 and the preamble of all the data 1 and the servo data of the postamble are assumed. There is assumed a case in which the servo data (0/1) is converted into coded data (0000/1010) as shown in FIG. 10A, and is recorded on the disk 1 in the NRZI recording method. Here, the minimum magnetization reverse interval Tmin of the servo data which has been coded and recorded is set to 65 bit. In this case, the read signal read from the head 3 has a signal waveform as shown in FIG. 10B. Incidentally, the read signal waveform does not include noises.

Figure 11A:
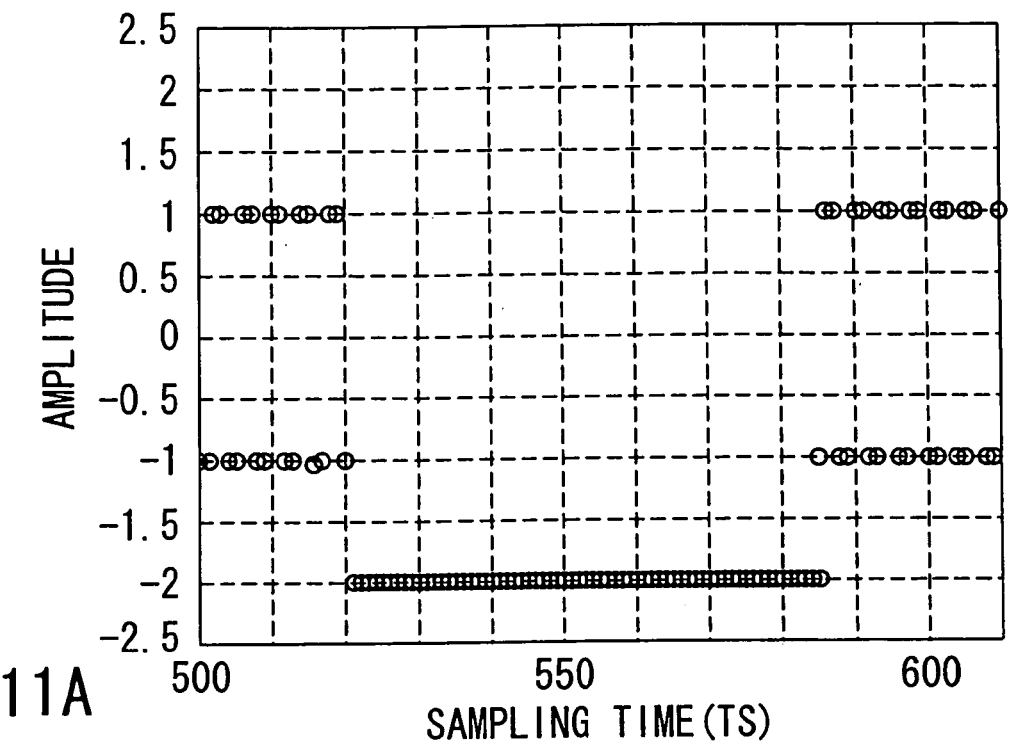
FIGS. 11A and 11B are views showing a state of a sample signal at the time of a reading operation in the simulation experiment.
Figure 11B:
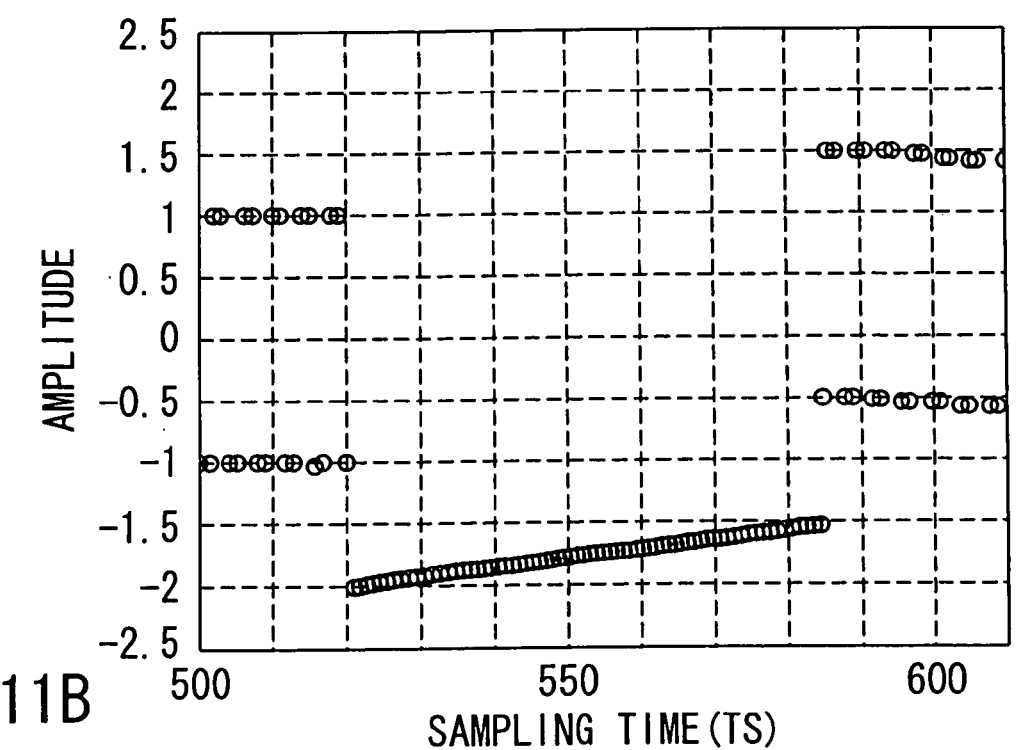

Furthermore, in the read signal in the case where the signal processing in the PRML method of the read/write channel 11 is conducted and in the case where the signal is not affected by the cut-off low frequency characteristic, a sample signal after the equalization processing of the PR 2 method as shown in FIG. 11A can be obtained. On the other hand, in the read signal in the case where the signal is affected by the low area shield characteristic, a sample signal after equalization processing of PR 2 method as shown in FIG. 11B can be obtained. Here, it is assumed that the cut-off low frequency fc of the read/write channel can be set to $fc = (-\ln 0.75)/(2\pi Tmin)$.

Figure 12A:
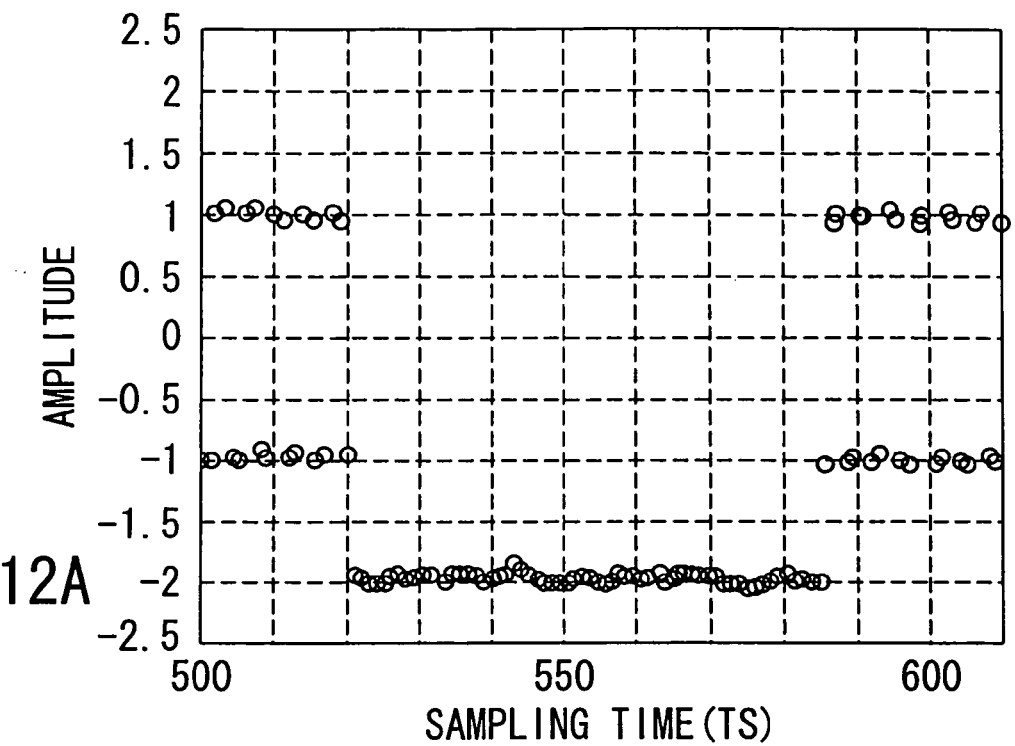
FIGS. 12A and 12B are views showing a state of a sample signal at the time of a reading operation in the simulation experiment.
Figure 12B:
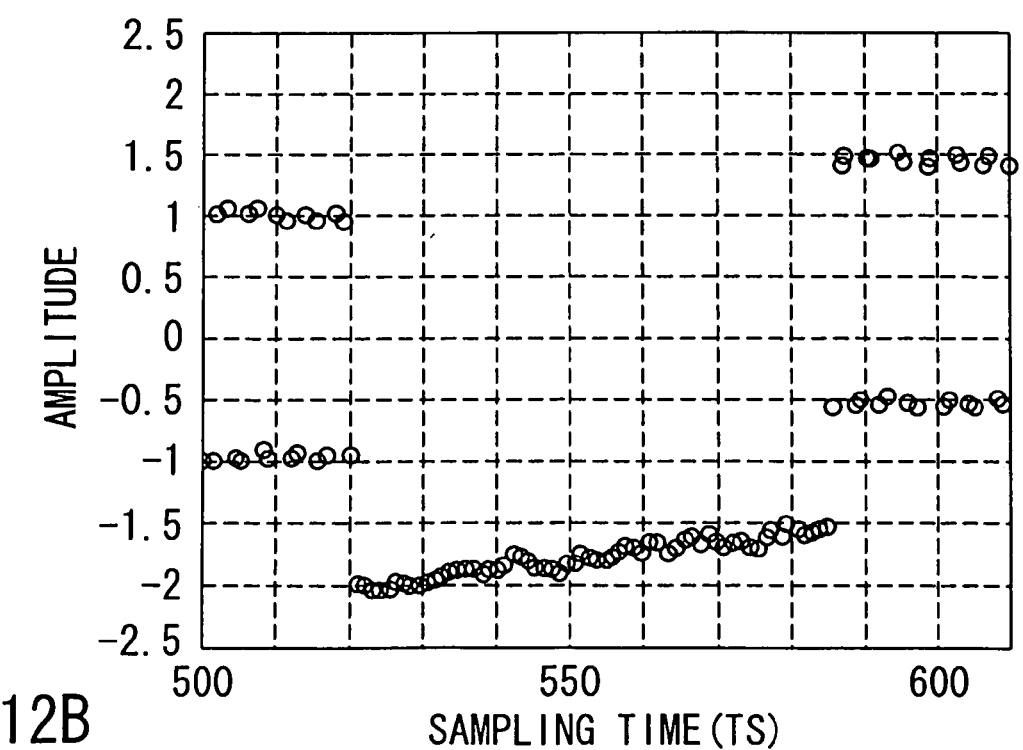

Next, it is assumed that the S/N ratio (SNR) of the read signal is set to SNR=37.2 dB. In a read signal in the case where the signal is not affected by the cut-off low frequency characteristic of the read/write channel 11, a sample signal after PR 2 equalization processing as shown in FIG. 12A is obtained. On the other hand, in a read signal in the case where the signal is affected by the cut-off low frequency characteristic, a sample signal after PR 2 equalization processing as shown in FIG. 12B is obtained. In this case as well, the cut-off low frequency fc of the read/write channel is set to $fc = (-\ln 0.75)/(2\pi Tmin)$.

Figures 13, 14:
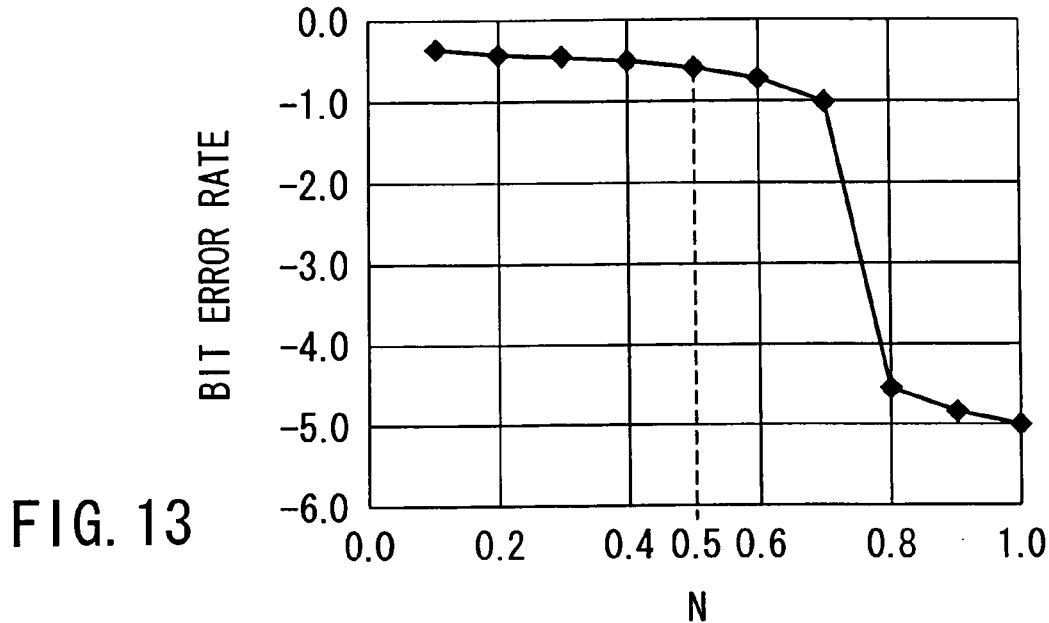
FIG. 13 is a view showing a read error rate characteristic in the simulation experiment.
FIG. 14 is a view showing a read error rate in the simulation experiment.

FIGS. 13 and 14 are views showing the case in which the S/N ratio (SNR) of the read signal is set to SNR=37.2 dB, the case showing a result of the simulation experiment showing a relationship with the bit error rate (BER) or read error rate with respect to the N in the encoding recording which satisfied a condition of $Tmin \leq (-\ln N)/(2\pi fc)$ which shows a relationship between the minimum magnetization reverse interval time Tmin of the servo data and a cut-off low frequency fc of the read/write channel 11.

By this simulation, it has been confirmed that when N is 0.75 or more, the bit error rate (read error rate) is extremely suppressed.

As described above, in the case where PR2 class PRML method is applied as the data detection method, the bit error rate is improved when N is set to 0.75 or more. It is desirable that N is set to 0.5 or more in consideration of the PRML method of different PR class and other data detection method are applied.

As has been described in detail, according to the present invention, the read error rate of the servo data having a low frequency liable to be affected particularly by the cut-off low frequency characteristic of the read/write channel can be suppressed with the write-data encoding method which is applied to the perpendicular magnetic recording method. Consequently, at the time of the position control of the head, the generation of the error data included in the servo data reproduced from the disk can be suppressed, the precision in the position control of the head such as a seek operation or the like can be improved. As a consequence, a sufficient performance of the disk is realized as a result, so that the realization of the magnetic disk apparatus of the perpendicular magnetic recording method can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive having a perpendicular magnetic recording system and a head that performs read and write operations in accordance with the perpendicular magnetic recording system, said disk drive comprising:
   a disk medium including a magnetized area corresponding to data recorded with the perpendicular magnetic recording system and the head and a servo area in which servo data encoded with DC free code is recorded, servo data being used to control a position of the head;
   a decoding unit configured to decode the servo data;
   a read channel configured to conduct signal processing of a read signal read with said head from said servo area of said disk medium;
   wherein said read channel extracts the read signal whose level changes depending upon the magnetization transfer position of said magnetized area and has a predetermined low cut-off frequency fc characteristic for eliminating low frequency component of the read signal, and
   wherein the low cut-off frequency fc is predetermined by the relationship:

$T\min \leq (-\ln N)/2\pi fc$, where Tmin is a minimum magnetization reverse interval time of said DC free coded servo data and N is a constant based on a read error rate of servo data.

2. A disk drive having a perpendicular magnetic recording system, a disk medium on which a magnetized area corresponding to data recorded on said perpendicular magnetic recording system is formed in a perpendicular direction with respect to a medium surface, and a head configured to perform read and write operation of the data with respect to said disk medium, said disk drive comprising:
   a read channel having a predetermined cut-off frequency characteristics fc that eliminates low frequency component of a read signal for extracting a read signal waveform whose level changes at a magnetization transfer position of the magnetized area from the read signal read with said head from said disk medium;
   wherein said disk medium includes a servo area in which servo data is recorded, said servo data being used to control position of said head, said recorded servo data comprising coded data in which the sum total of the length in the longitudinal direction of the area having a positive polarity of said magnetized area and the sum total of the length in the longitudinal direction of the area having a negative polarity become equal to each other; and
   wherein said read channel extracts the read signal whose level changes depending upon the magnetization transfer position of said magnetized area and has a predetermined cut-off frequency fc characteristics to eliminate low frequency component of a read signal which is predetermined by the relationship:

$T\min \leq (-\ln N)/2\pi fc$, where Tmin is minimum magnetization reverse interval time of said coded servo data on the servo area and N is a constant based on a read error rate of servo data.

3. A disk drive having a perpendicular magnetic recording system, a disk medium on which a magnetized area corresponding to data recorded on said perpendicular magnetic recording system is formed in a perpendicular direction with respect to the medium surface, and a head configured to perform read and write operations of the data with respect to said medium, said disk drive comprising:
   a read channel having a predetermined cut-off frequency characteristics fc for extracting a read signal waveform whose level changes at a magnetization transfer position of the magnetization area from the read signal read with said head from said disk medium;
   wherein said disk medium has a servo area in which servo data is recorded, said servo data being used to control position of said head, the recorded servo data comprising coded data in which the minimum magnetization reverse interval time Tmin of said magnetized area satisfies the following condition:

$T\min \leq (-\ln N)/2\pi fc$, wherein fc is a predetermined cut-off frequency of said read channel for eliminating low frequency component of a read signal and N is a constant based on a read error rate of servo data.

4. The disk drive according to claim 3, wherein the data comprising coded data satisfying said Tmin condition has the constant N set to 0.5 or more.

5. A method of recording coded servo data in a disk drive having a disk medium, a head, and a read channel, the method comprising:
   providing the read channel with a predetermined cut-off frequency fc to eliminate low frequency component of a read signal;
   configuring the read signal to extract a read signal waveform having levels that change at a magnetization transfer position located in a magnetization area of said disk medium;
   encoding, via the read channel, the servo data used in the positioning control of the head to coded data in which the minimum magnetized area satisfies the condition of $T\min \leq (-\ln N)/2fc$, wherein fc is a predetermined cut-off frequency of said read channel for eliminating low frequency component of a read signal and N is a constant based on a read error rate of servo data; and
   performing, via the read channel, the perpendicular magnetic recording of the servo data in the servo area on the disk medium.

* * * * *